April 5, 1938.  J. R. POWER  2,113,220
RECTIFIER SYSTEM
Filed June 1, 1936
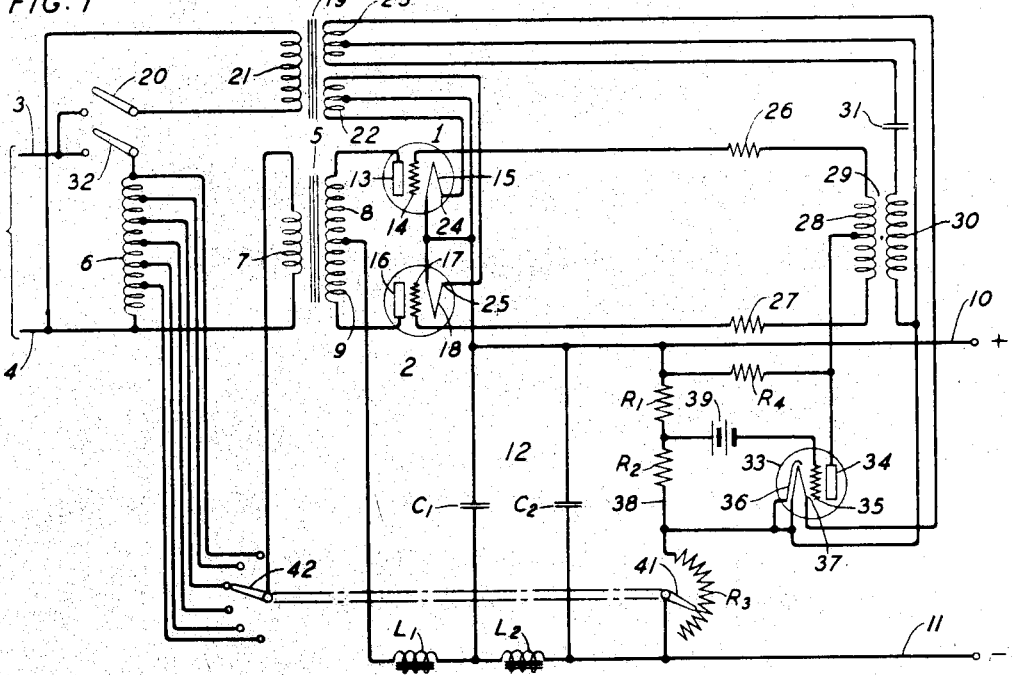
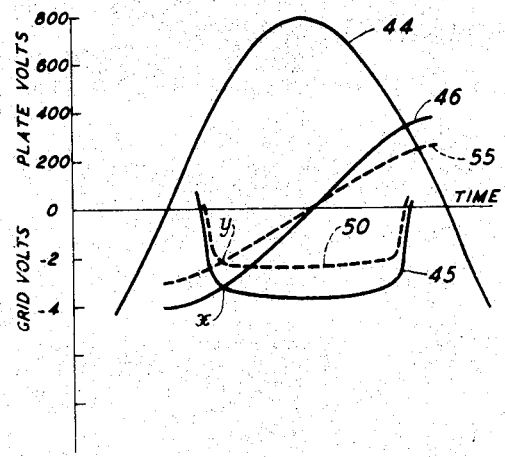
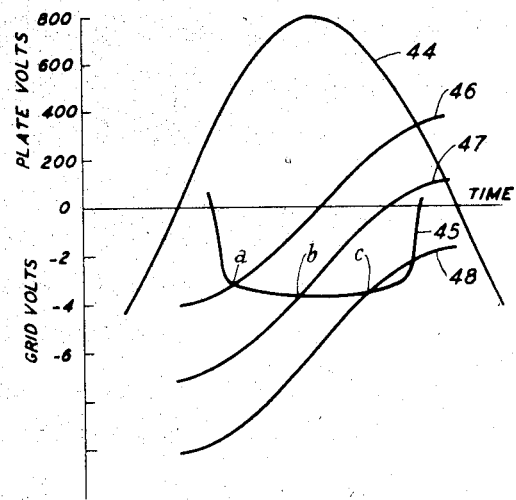
INVENTOR
J. R. POWER
BY Wayne B Wells
ATTORNEY Patented Apr. 5, 1938

2,113,220

UNITED STATES PATENT OFFICE 2,113,220

RECTIFIER SYSTEM

James R. Power, East Orange, N. J., assignor to Bell Telephone Laboratories, Incorporated, New York, N. Y., a corporation of New York Application June 1, 1936, Serial No. 82,882

15 Claims. (Cl. 175—363)

This invention relates to rectifier systems and particularly to regulated rectifier systems.

One object of the invention is to provide a rectifier system with a gas-filled rectifier device having alternating and direct potential bias impressed on the control grid of the device that shall vary the direct potential bias to maintain the rectified potential substantially constant.

Another object of the invention is to provide a rectifier system having a gas-filled rectifier device governed by a control grid and connected to an alternating current supply circuit that shall be connected to a load circuit by a filter serving to prevent sharp changes in the rectified voltage while preventing delay in the rectifier cut-off.

Another object of the invention is to provide a rectifier system with a three-element gas-filled rectifier governed by alternating and direct potential impressed on the grid that shall have the filament of the rectifier heated by alternating current with the filament terminals polarized to add the potential drop across the filament to the critical grid voltage.

A further object of the invention is to provide a rectifier system having a gas-filled rectifier device connected between an alternating current supply circuit and a direct current load circuit and direct and alternating potential bias impressed on the control grid of the device that shall vary the direct potential bias in an improved manner to maintain the rectified voltage substantially constant and that shall vary the level at which the rectified voltage is maintained constant in an improved manner.

In rectifier systems it is very desirable and often essential to maintain the rectified voltage substantially constant. The load circuit voltage must be maintained constant irrespective of changes in load on the load circuit or of changes in voltage on the supply circuit. Furthermore, the rectified voltage must not only be maintained constant but the level at which the load circuit voltage is maintained constant should be varied at will.

In a rectifier system constructed in accordance with the invention two gas-filled space discharge devices are connected in opposition between an alternating current supply circuit and a direct current load circuit to supply full wave rectified current to the load circuit. The term gas-filled space discharge device is intended to include vapor filled devices. The grids of the gas-filled devices not only have alternating potential bias impressed on them, but also have a direct potential bias impressed on them for controlling the voltage of the load circuit. The alternating current bias impressed upon the grids of the rectifier devices lags approximately 90 degrees behind the potential impressed on the plates. The phase relation between the potential impressed upon the plate of each tube and the alternating potential impressed on the grid is maintained substantially constant.

A filter which is interposed between the gas-filled devices and the load circuit is designed in a manner to insure against holdover in the cut-off of the gas-filled devices and to insure against sudden change in the load circuit voltage. In order to prevent hangover in the cut-off of the gas-filled devices the reactance of the series inductance element in the input section of the filter is made relatively small. In order to prevent sudden change in the voltage of the load circuit the shunt capacity element in the output of the filter is made relatively large. Unless the series inductance element in the input section of the filter is made relatively small, it is difficult to obtain cut-off by the gas-filled devices. The hangover period may be a substantial portion of the conducting period at very light loads. The output capacity element of very large size may under many conditions be replaced by a floating battery if so desired.

A resistance comprising three sections is connected across the load circuit. A regulator space discharge device has the grid circuit thereof connected across one section of said resistance. Plate potential for the regulator device is provided by the drop across two sections of said resistance. A source of grid bias is connected to the grid circuit of the regulator device to provide a bias in opposition to the drop across the resistance section connected to the regulator grid circuit. In the regulating range the potential drop across the resistance section is slightly smaller than the potential supplied in opposition thereto. The plate circuit of the regulator tube is coupled to the grid circuits of the rectifier devices in order to supply a direct potential bias for so controlling the rectifier devices as to maintain the rectified voltage substantially constant.

A third section of the resistance connected across the load circuit is made variable in order to control the level at which the load circuit voltage is maintained constant. A variable auto-transformer is inserted in the alternating current supply circuit ahead of the rectifier devices for controlling the potential impressed on the plate of the rectifier devices. The auto-transformer is varied in order to insure that the voltage impressed on the plates of the rectifier devices effects efficient rectification under optimum conditions. Preferably the adjustment of the third section of the resistance across the load circuit and the auto-transformer in the supply circuit are effected simultaneously by the same means so that a change in the load circuit conditions is effected at the same time that a change in the potential impressed on the plates of the rectifiers takes place.

The filaments of the two gas-filled rectifier devices are connected in series to the alternating current supply circuit in order to provide a moderate gain in the reliability of control of the regulator. The terminals of the filaments opposite to the common grid return terminal are polarized oppositely to the polarization of the associated plates. The series connection of the filaments and polarizing them as above set forth causes a shift in the critical grid voltage measured between the grid and the grid return connection according to the potential drop across the filaments. An increase in the critical grid voltage permits an increase in the magnitude of the alternating potential bias which is impressed on the grids of the gas-filled rectifier devices. Increasing the alternating potential bias on the grid of the rectifier devices increases the angle of intersection of the grid bias with the critical voltage as will be pointed out in detail.

In the accompanying drawing Fig. 1 is a diagrammatic view of a regulator system constructed in accordance with the invention;

Fig. 2 is a set of curves showing the plate voltage, the critical grid voltage, and the grid bias for a conducting half-cycle of a rectifier device;

Fig. 3 is a set of curves of critical grid voltage and grid bias showing the effect of polarizing the filament terminal opposite to the grid return terminal oppositely to the polarity of the plate.

Referring to Fig. 1 of the drawing two gas-filled space discharge rectifiers 1 and 2 are connected to alternating current supply conductors 3 and 4 by means of a transformer 5 and an auto-transformer 6. The transformer 5 comprises a primary winding 7 and two secondary windings 8 and 9. A load circuit comprising conductors 10 and 11 is connected by a filter 12 to the rectifier devices 1 and 2 to be supplied with full wave rectified current from the supply conductors 3 and 4.

The rectifier device 1 comprises an anode 13, a grid 14 and a filament 15. The rectifier device 2 comprises an anode 16, grid 17 and a filament 18. A transformer 19 which is connected to the alternating current supply conductors 3 and 4 by a switch 20 supplies heating current to the filaments 15 and 18. The transformer 19 comprises primary winding 21, secondary winding 22 and secondary winding 23. Secondary winding 22 is connected to the series connected filaments 15 and 18 of the rectifier devices 1 and 2. The connection is so made that referred to the grid and plate return connection the terminal 24 of the filament 15 is polarized oppositely to the polarization of the anode 13, and the terminal 25 of the filament 18 is polarized oppositely to the polarization of the anode 16. The polarizing of the terminals of the filaments as above set forth serves to increase the critical external grid voltage according to the potential drop across the filaments.

The grids 14 and 17 of the rectifier devices 1 and 2 are connected through resistance elements 26 and 27 to a divided secondary winding 28 of a transformer 29. The resistance elements 26 and 27 serve to oppose the flow of current through the grid circuits. The primary winding 30 of the transformer 29 is connected through a condenser 31 to a section of the secondary winding 23. The transformer 29 and the secondary winding 23 of the transformer 19 serve to impress alternating potential bias on the grids 14 and 17 from the supply conductors 3 and 4. The condenser 31 serves to effect a lag of approximately 90 degrees in the alternating potential impressed on the grids 14 and 17 with respect to the alternating potential impressed on the anodes 13 and 16. The phase relation between the alternating potential impressed on the grids 14 and 17 with respect to the alternating potential impressed on the anodes 13 and 16 is assumed to remain substantially constant. A switch member 32 is provided for connecting one terminal of the auto-transformer 6 to the alternating current supply conductor 3. In operation of the rectifier system the switch 20 should be closed for about 10 seconds before the switch 32 is closed.

A three-element space discharge device 33 is provided for impressing a direct potential bias on the grids 14 and 17 of the rectifier devices 1 and 2 according to the voltage across the load conductors 10 and 11. The rectifier device 33 comprises an anode 34, a grid 35 and a cathode 36 which is heated by filament 37. The filament 37 is heated by a current supplied from the secondary winding 23 of the transformer 19. A resistance 38 which is connected across the load conductors 10 and 11 is divided into sections R1, R2 and R3. The grid circuit for the regulator device 33 is connected across the resistance section R2. In this grid circuit is provided a battery 39, the potential of which opposes the potential drop across the resistance section R2. Anode potential for the regulator device 33 is provided by the potential drop across the resistance sections R1 and R2. A coupling resistance R4 in the anode circuit of the regulator device 33 serves to impress the direct potential bias on the grids 14 and 17 of the rectifier devices 1 and 2. The bias impressed on the grid 35 of the regulator device 33 is the difference between the voltage of the battery 39 and the potential drop across the resistance section R2. In the regulating range the potential drop across the resistance section R2 is slightly less than the voltage of the battery 39. In the regulating range the current through the resistance section R2 and therefore through the entire resistance 38 must be maintained at approximately fixed value. The load circuit voltage at which the regulator operates is therefore equal to this fixed current times the total resistance of a resistance 38. By reason of this fact adjustment of the level at which the load circuit voltage is maintained constant is controlled by varying the resistance section R3. The resistance section R3 is varied by means of a contact arm 41.

During operation of the regulator device 33 an increase in the load circuit voltage will increase the potential drop across the resistance section R2 and thereby decrease the negative grid bias on the regulator device 33. This action will increase the current flow through the device and increase the current flow through the coupling resistance R4. An increase in the current flow through the coupling resistance R4 increases the direct negative bias on the grids 14 and 17 of the rectifier devices 1 and 2. An increase in the direct potential bias retards the triggering off point for the rectifier devices 1 and 2 will be explained more in detail when reference is made to Fig. 2 of the drawing. Delaying the triggering off point of the rectifier devices 1 and 2 serves to reduce the voltage on the load conductors 10 and 11.

The filter 12 is provided with a series inductance L1, a series inductance L2, a shunt capacity impedance C1 and a shunt capacity impedance C2. The inductance L1 in the input section of the filter is made relatively small in order to prevent delay in the cutoff points of the rectifier devices 1 and 2. In general the reactance of the inductance L1 at twice the frequency of the supply circuit current should not be more than three to five times the reactance of the shunt capacity C1. It is necessary to prevent delay in the extinguishing of the rectifier devices 1 and 2 if lower load limits of stable operation are to be provided.

Any regulator device tends to hunt or oscillate when the precision of regulation is increased beyond a critical value. Predominant factors controlling this critical value are the abruptness of the change in the function being regulated, in the present case the output voltage, and the delay in its correction. The delay is due to the time required to transmit a signal through the regulating circuits plus the time required for the source to be corrected. In the present circuit the signal is transmitted through the regulator instantaneously. There is a delay which may reach a half cycle in the rectifier device response and a further delay in transmitting the correction through the filter. Inasmuch as the filter delay is usually determined by requirements covering the output noise level, the circuit has minimum practical time delay. An increase in the stability of operation is therefore largely dependent upon a reduction of the abruptness of output voltage changes. This is accomplished and a greater precision thereby made permissible by the use of a large shunting condenser C2.

The auto-transformer 6 is controlled by a contact arm 42 to govern the potential impressed on the anodes 13 and 16 of the rectifier devices 1 and 2. The transformer 6 is adjusted so as to operate the rectifier devices 1 and 2 efficiently and to insure operation under optimum conditions. Preferably, the contact arm 42, which controls the auto-transformer 6 and the contact arm 41, are mechanically connected so as to be operated simultaneously. It is, of course, apparent that a change in the resistance section R3 with resulting change in load circuit voltage requires a corresponding change in the auto-transformer 6.

If the voltage across the load conductors 10 and 11 tends to increase, the voltage drop across the resistance section R2 tends to increase. This lowers the negative bias on the grid 35 of the regulator device 33. An increased current flows through the regulator device 33 to increase the potential drop across the coupling resistance R4. An increase in the potential drop across the coupling resistance R4 increases the negative direct potential bias impressed on the grids 14 and 17 of the rectifier devices 1 and 2. An increase in the direct potential bias retards the triggering off point of the rectifier devices 1 and 2. This, in turn, reduces the rectified voltage supplied to the load conductors 10 and 11. An opposite effect takes place if the voltage on the load conductors 10 and 11 tends to fall below normal value.

The regulator device 33 will operate to maintain a constant potential drop across the resistance section R2. In maintaining a constant potential drop across the resistance section R2 the voltage of the load circuit conductors 10 and 11 will be maintained constant. In view of the above fact it is apparent that a change in the resistance section R3 must cause a change in the level at which the load circuit voltage is maintained constant. This is apparent because the potential drop across the resistance section R2 is held constant and therefore the level at which the load circuit voltage is held constant must change if a change is made in the resistance section R3.

Referring to Fig. 2 of the drawing a set of curves are shown with time or electrical degrees as abscissae and plate volts and grid volts as ordinates. The curves represent the operation for a conducting half-cycle of one rectifier device. The curve 44 may be considered the plate voltage of one rectifier device. The curve 45 represents the critical grid voltage for one rectifier device. By critical grid voltage is meant the voltage between the grid and the grid return connections at which the rectifier device may be ignited. The curves 46, 47 and 48 represent grid biasing currents with different amounts of direct potential bias. At the point $a$ where the grid bias curve 46 intersects the critical grid voltage curve 45 the rectifier device will trigger off to permit current flow therethrough. If negative direct current bias is added to the rectifier device a curve as shown by curve 47 is produced which intersects the critical grid voltage curve at point $b$. The rectifier device under such condition will ignite and start to conduct current at a much later time as shown by the distance on the abscissae between points $a$ and $b$. If more direct potential bias is added to the grid of the rectifier device a curve such as 48 may be provided which intersects the critical voltage curve at a point $c$. The point $c$ will then indicate the time of ignition for the rectifier tube.

Referring to Fig. 3 of the drawing, curves are drawn to show the effect of connecting the filaments 15 and 18 of the rectifier devices 1 and 2 in series and polarizing the terminals of the filaments in the manner before set forth. The terminals 24 of the filament 15 must be polarized oppositely to the polarization of the anode 13 and the filament terminal 25 must be polarized oppositely to the polarization of the anode 16. The curves shown in Fig. 3 of the drawing are similar to the curves shown in Fig. 2 of the drawing and similar curves will be designated by like reference characters. Curve 44 may be considered to represent the plate voltage and the curve 46 may be considered to represent a grid bias curve as in Fig. 2 of the drawing. A curve 50 represents a critical grid voltage curve for a rectifier device in which the filament is connected in parallel and the grid return connection made to the mid-point of the filament transformer winding. The curve 45 represents a critical grid voltage curve for a rectifier device in which the filament is connected in series as shown in Fig. 1 of the drawing. The difference between the critical voltage curves 45 and 50 is essentially one-half the voltage drop across a filament of a rectifier device. The advantage of the critical grid voltage curve 45 over the critical grid voltage curve 50 is apparent by considering the intersection of the grid bias curve 46 with the curve 45 at point $x$ and the intersection of a grid bias curve 55 with the critical grid voltage curve 50 at point $y$. The points $x$ and $y$ are at the same point with respect to the abscissae and will ignite the rectifier device at the same point. However, it will be noted that the grid bias curve 46 of larger alternating current bias intersects the curve 45 at a much sharper angle than the curve 55 intersects the curve 50. The sharper the intersection between the grid bias curve and a critical voltage curve, the more stable the operation of the regulator. Therefore, it is desirable to have as large an alternating current bias on the grids as possible. By connecting the filament of the rectifier devices in series and polarizing them as before set forth, a higher alternating current bias may be obtained.

Modifications in the circuits and in the arrangement and location of parts may be made within the spirit and scope of the invention and such modifications are intended to be covered by the appended claims.

What is claimed is:

1. In a rectifier system, an alternating current supply circuit, a direct current load circuit, two gas-filled space discharge devices, means for connecting said devices between said circuits to supply the load circuit with full wave rectified current, means for impressing alternating current on the grids of said devices substantially 90 degrees out of phase with the potential impressed on the plates of the devices, and means for impressing a direct current bias on the grids of said devices according to the load circuit voltage to control said devices and maintain the load circuit voltage substantially constant.

2. In a rectifier system, an alternating current supply circuit, a gas-filled space-discharge rectifier device having a control grid, means for controlling said device by varying the potential on the grid thereof, said device being connected to said supply circuit, and a filter comprising series and shunt impedance elements for connecting said device to a load circuit, said filter having a series inductance element at its input end which has relatively small reactance to prevent delay in the rectifier cut-off and a condenser of relatively large capacity serving as the output shunt element of the filter to prevent quick changes in the load circuit voltage.

3. In a rectifier system, an alternating current supply circuit, a rectifier space discharge device connected to said circuit and having a control grid, a filter comprising series and shunt elements for connecting said device to a load circuit, said filter having a series inductance element at its input end which has a relatively small reactance to prevent delay in the rectifier cut-off and a storage element of relatively large size serving as the output shunt element of the filter to prevent sharp changes in the load circuit voltage, and means for varying the potential on the grid of said device to maintain the load circuit voltage constant.

4. In a rectifier system, an alternating current supply circuit, a gas-filled space-discharge rectifier device having a control grid and connected to said circuit, a filter comprising series and shunt elements for connecting said device to a load circuit, said filter having a series inductance element at its input end which has relatively small reactance to prevent delay in the rectifier cut-off and a condenser of relatively large capacity serving as the output shunt element of the filter to prevent quick changes in the load circuit voltage, and means for impressing an alternating current bias and a direct current bias on the grid of said device and for varying the direct current bias according to the voltage of the load circuit to maintain the load circuit voltage constant.

5. In a rectifier system, a three-element space discharge rectifier connected between an alternating current supply circuit and a direct current load circuit, a resistance divided into sections and connected across said load circuit, means comprising a space discharge regulator device having a control grid for controlling the potential bias on the rectifier grid to govern the load circuit voltage, means comprising a source of biasing potential connected in the grid circuit of the regulator device in opposition to the voltage across one section of said resistance for controlling the regulator device to maintain the load circuit voltage constant, and means for varying another section of said resistance to govern the level at which the load circuit voltage is maintained constant.

6. In a rectifier system, a direct current load circuit, a source of potential for said load circuit, a resistance divided into sections and connected across said load circuit, a space discharge regulator device having the grid circuit thereof connected across one section of said resistance, a biasing potential connected in the grid circuit of said regulator device in opposition to the potential drop across said section of resistance, means comprising a second space discharge device controlled by said regulator device for controlling said source to maintain the load circuit voltage substantially constant, and means for varying another section of said resistance to govern the level at which the load circuit voltage is maintained constant.

7. In a rectifier system, an alternating current supply circuit, a direct current load circuit, a gas-filled space discharge rectifier connected between said circuits and having a control grid, an adjustable transformer connected between said supply circuit and the rectifier for controlling the potential impressed on the rectifier plate, a resistance divided into sections and connected across said load circuit, a space discharge regulator device having the grid circuit thereof connected across one section of said resistance, a biasing potential connected in the grid circuit of said regulator device in opposition to the potential drop across said section of resistance, means controlled by said regulator device for governing the potential bias on the control grid of said rectifier to maintain the load circuit voltage substantially constant, and means for varying another section of said resistance to govern the level at which the load circuit voltage is maintained constant and for simultaneously varying said adjustable transformer to maintain an optimum potential on the rectifier plate.

8. In a rectifier system, a gas-filled space discharge device having a control grid, means for connecting said device between an alternating current supply circuit and a direct current load circuit, means for impressing an alternating current bias on the grid of said device which is out of phase with respect to the potential on the plate a constant amount, a resistance element connected across said load circuit, a regulating space discharge device having a control grid, a source of negative potential connected to the grid of the regulating device, means for connecting the grid circuit of said regulating device across said resistance with the potential drop across the resistance element opposing the negative bias impressed on the grid of the regulating device, and means controlled by said regulating device for impressing a negative bias on the grid of said gas-filled device to maintain the rectified voltage substantially constant.

9. In a rectifier system, a rectifier space discharge device having a control grid, means for connecting said device between an alternating current supply circuit and a direct current load circuit, means for impressing an alternating current bias on the grid of said device which is out of phase with respect to the potential on the plate a constant amount, a regulating space discharge device, means for operating said regulating device according to the voltage on said load circuit, and means controlled by said regulating device for impressing a direct current bias on the grid of said rectifier device to maintain the rectified voltage substantially constant.

10. In a rectifier system, a gas-filled space discharge device having a control grid, means for connecting said device between an alternating current supply circuit and a load circuit to supply the load circuit with rectified current, means for impressing an alternating current bias on the grid of said device which is out of phase with respect to the potential on the plate of the device a constant amount, an impedance divided into sections and connected across said load circuit, a regulating space discharge device having a control grid, a source of negative potential connected to the grid of the regulating device, means for connecting the grid circuit of said regulating device across a section of said impedance with the potential drop of the section in opposition to the negative bias impressed on the grid of the regulating device and for obtaining plate potential for the regulating device from a number of said impedance sections, and means controlled by said regulating device for impressing a negative bias on the grid of said gas-filled device to maintain the rectified voltage substantially constant.

11. In a rectifier system, an alternating current supply circuit, a direct current load circuit, two gas-filled space discharge rectifiers having control grids, means for connecting said rectifiers between the supply circuit and the load circuit to supply the load circuit with full wave rectified current, means for connecting the filaments of said rectifiers in series relation to the alternating current supply circuit with the grid return terminal connected between the series connected filaments and with the filament terminal opposite the grid return terminal of each filament polarized oppositely to the associated anode to increase the critical external grid voltage, and means for impressing an alternating current and a direct current bias on the grids of said rectifiers.

12. In a rectifier system, an alternating current supply circuit, a direct current load circuit, two three-element gas-filled rectifiers, means for connecting said rectifiers oppositely between the supply circuit and the load circuit to supply the load circuit with full wave rectifier current, means for connecting the filaments of said rectifiers in series relation to the alternating current supply circuit, the grid return terminal being connected between the series connected filaments and the filament terminal opposite the grid return terminal of each filament being polarized oppositely to the associated anode to increase the critical external grid voltage, means for impressing an alternating potential on the grids of said rectifiers out of phase with respect to the anode potentials a constant amount, and means for impressing a direct current bias on the grids of said rectifiers which varies according to the voltage of the load circuit.

13. In a rectifier system, a three-element gas-filled rectifier connected between an alternating current supply circuit and a direct current load circuit, means for impressing an alternating potential on the grid of said rectifier which is out of phase with respect to the anode potential a constant amount, means for impressing a direct current bias on the grid of said rectifier which varies according to the load circuit voltage, and means for connecting the filament of said rectifier to the alternating current supply circuit with the filament terminals polarized so that the filament terminal opposite to the grid return terminal is polarized oppositely to the anode of the rectifier.

14. In a rectifier system, a three-element gas-filled rectifier connected between an alternating current supply circuit and a direct current load circuit, means for impressing an alternating potential on the grid of said rectifier which is out of phase with respect to the anode potential a constant amount, means for impressing a direct current bias on the grid of said rectifier which varies according to the load circuit voltage, and means for energizing the filament of said rectifier with alternating potential and for effecting polarization of the filament terminals with respect to the anode potential so that the voltage drop across the filament is added to the critical external grid voltage.

15. In a rectifier system, a three element gas-filled rectifier connected between an alternating current supply circuit and a direct current load circuit, means for impressing an alternating potential on the grid of said rectifier which is out of phase with respect to the anode potential a constant amount, means for impressing a direct current bias on the grid of said rectifier which varies according to the load circuit voltage, and means for energizing the filament of said rectifier with the filament terminals polarized so that the filament terminal opposite to the grid return terminal is polarized oppositely to the anode of the rectifier.

JAMES R. POWER.